US011892936B2

(12) United States Patent
Nelson et al.

(10) Patent No.: US 11,892,936 B2
(45) Date of Patent: Feb. 6, 2024

(54) PROFILING A PROGRAM BASED ON A COMBINATION OF DYNAMIC INSTRUMENTATION AND SAMPLING

(71) Applicant: Microsoft Technology Licensing, LLC, Redmond, WA (US)

(72) Inventors: Patrick Lothian Nelson, Redmond, WA (US); Nikolaus Lee Karpinsky, Melbourne, FL (US); Liqi Han, Redmond, WA (US)

(73) Assignee: Microsoft Tech nology Licensing, LLC, Redmond, WA (US)

(*) Notice: Subject to any disclaimer, the term of this patent is extended or adjusted under 35 U.S.C. 154(b) by 116 days.

(21) Appl. No.: 17/718,129

(22) Filed: Apr. 11, 2022

(65) Prior Publication Data

US 2023/0325299 A1    Oct. 12, 2023

(51) Int. Cl.
*G06F 11/36* (2006.01)
*G06F 8/41* (2018.01)

(52) U.S. Cl.
CPC ............ *G06F 11/3612* (2013.01); *G06F 8/41* (2013.01)

(58) Field of Classification Search
CPC ..... G06F 11/3612; G06F 8/41; G06F 11/3664
See application file for complete search history.

(56) References Cited

U.S. PATENT DOCUMENTS

| | | | | |
|---|---|---|---|---|
| 5,828,883 A | * | 10/1998 | Hall .................... | G06F 11/3409 717/133 |
| 6,049,666 A | * | 4/2000 | Bennett ................. | G06F 11/323 714/E11.181 |
| 7,143,394 B1 | * | 11/2006 | Shadmon ............ | G06F 11/3612 717/130 |
| 7,730,460 B1 | * | 6/2010 | Warren ................. | G06F 11/323 717/133 |
| 9,612,945 B1 | | 4/2017 | Booss et al. | |
| 2004/0163077 A1 | * | 8/2004 | Dimpsey ............. | G06F 11/3466 717/130 |
| 2005/0283765 A1 | * | 12/2005 | Warren ............... | G06F 11/3409 717/131 |

(Continued)

OTHER PUBLICATIONS

"International Search Report and Written Opinion Issued in PCT Application No. PCT/US2023/011578", dated Jun. 1, 2023, 12 Pages.

(Continued)

*Primary Examiner* — Wei Y Zhen
*Assistant Examiner* — Brahim Bourzik
(74) *Attorney, Agent, or Firm* — Workman Nydegger

(57) ABSTRACT

A computer system is configured to profile a program during an execution of the program. Profiling the program includes obtaining, by a first profiler, a first set of information associated with the execution of the program, and obtaining a second set of information associated with one or more executions of the function. The second set of information includes at least a call count or an execution time of each of the one or more executions of the function. The computer system then identifies a subset of the first set of information that is associated with the one or more executions of the function, and creates aggregate information based on the subset of the first set of information and the second set of information. The aggregated information is then reported.

17 Claims, 10 Drawing Sheets

(56) References Cited

U.S. PATENT DOCUMENTS

| | | | | |
|---|---|---|---|---|
| 2011/0107313 A1* | 5/2011 | Baron | ............... | G06F 11/3612 717/130 |
| 2011/0138368 A1* | 6/2011 | Krauss | ............... | G06F 11/3409 717/133 |
| 2012/0054721 A1* | 3/2012 | Dadiomov | ......... | G06F 11/3466 717/131 |
| 2015/0347263 A1* | 12/2015 | Chau | ...................... | G06F 11/36 717/130 |
| 2017/0031738 A1* | 2/2017 | Maeda | ............... | G06F 11/3612 |

OTHER PUBLICATIONS

"Sampling and Call Count Instrumentation Profiling", Retrieved from: http://www.qnx.com/developers/docs/qnxcar2/index.jsp?topic=%2Fcom.qnx.doc.ide.userguide%2Ftopic%2Fprofiler_InstProfCallCount_.html, Retrieved Date: Feb. 22, 2022, 1 Page.

Froyd, et al., "Low-Overhead Call Path Profiling of Unmodified, Optimized Code", In Proceedings of the 19th Annual International Conference on Supercomputing, Jun. 20, 2005, pp. 81-90.

Gifford, Chandler, "Design and Analysis of an Instrumenting Profiler for Webassembly", Thesis presented to the Faculty of California Polytechnic State University in Partial Fulfillment of the Requirements for the Degree Master of Science in Computer Science, Jun. 2019, 71 Pages.

Jones, et al., "Analyze Memory Usage without Debugging in the Performance Profiler (C#, Visual Basic, C++, F#)", Retrieved from: https://docs.microsoft.com/en-us/visualstudio/profiling/memory-usage-without-debugging2?view=vs-2022, Feb. 19, 2022, 12 pages.

Potencier, Fabien, "Uprofiler", Retrieved from: https://github.com/FriendsOfPHP/uprofiler/blob/master/README.rst, Jun. 1, 2018, 14 Pages.

Shetty, Sagar, "New Dynamic Instrumentation Profiling for .NET", Retrieved from: https://devblogs.microsoft.com/visualstudio/new-dynamic-instrumentation-profiling/, Mar. 2, 2021, 6 pages.

Spivey, J.M., "Fast, Accurate Call Graph Profiling", In Journal of Software: Practice and Experience, vol. 34, Issue 3, Nov. 26, 2003, 17 Pages.

Szebenyi, et al., "Reconciling Sampling and Direct Instrumentation for Unintrusive Call-Path Profiling of MPI Programs", In Proceedings of International Parallel & Distributed Processing Symposium, May 16, 2011, pp. 640-651.

* cited by examiner

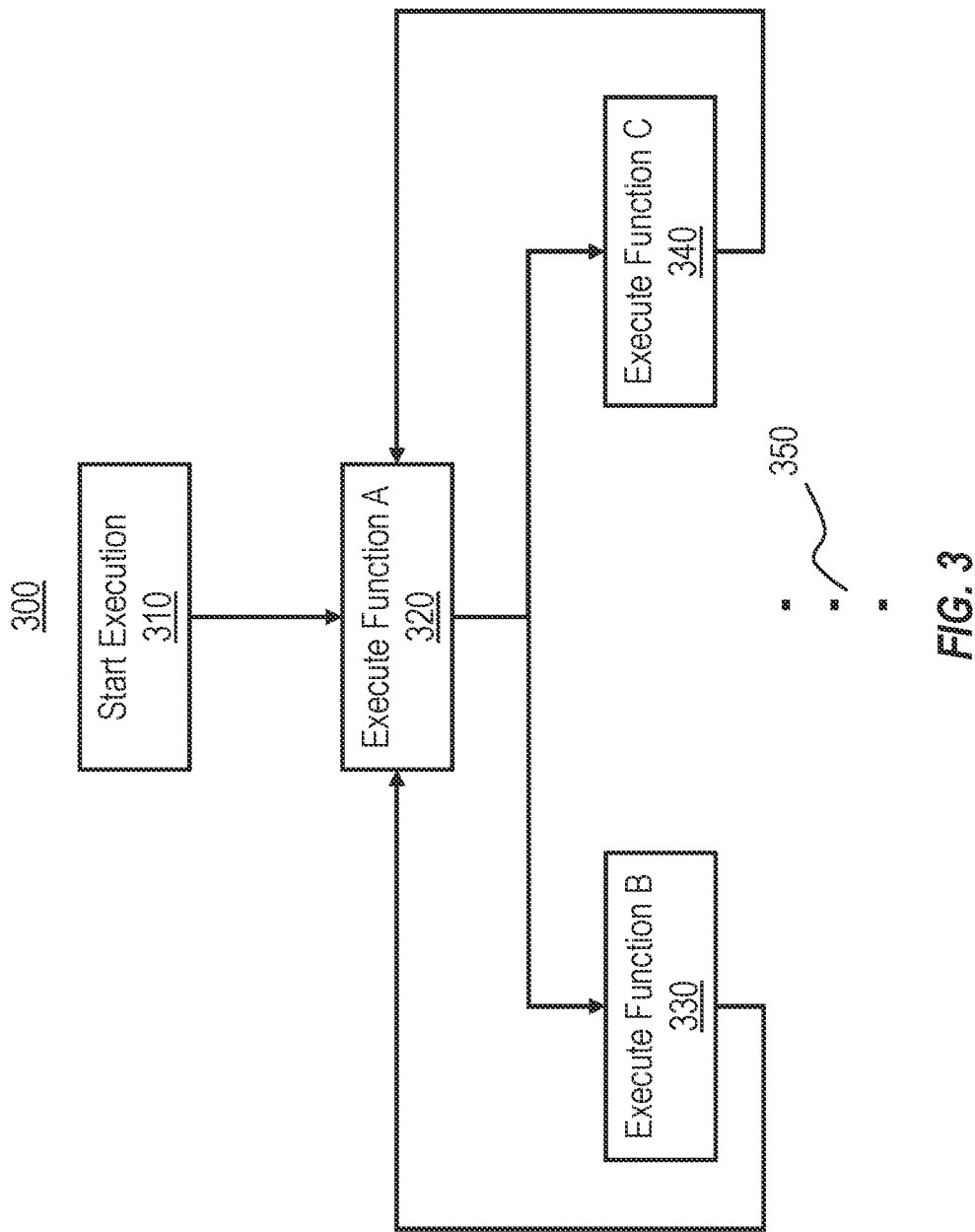

PROFILING A PROGRAM BASED ON A COMBINATION OF DYNAMIC INSTRUMENTATION AND SAMPLING

BACKGROUND

Traditionally, there are generally two methods for finding performance issues of a program using a profiler. One is sampling, and the other is instrumentation. Sampling generally includes periodically asking the program to provide information associated with the execution thereof. Instrumentation generally requires modifying the program, causing the modified program to record the steps during its execution.

The sampling and instrumentation methods each have their own pros and cons. A sampling profiler has the benefit of lower overhead and less disruption, but the information is less accurate, because only limited data is collected. The less data collected, the less statistically significant the results are. This may lead to incorrect conclusions. For example, a sampling profiler may indicate that there is a performance problem when there isn't such a problem, and/or vice versa.

An instrumentation profiler can provide more accurate information, but has the drawback of high overhead and is more disruptive. The instrumentation profiler requires modification of the program to cause the modified program to record the steps during its execution. As such, the instrumentation profiler can record all the events of interest. Although the instrumentation profile can collect more accurate data, it is often not practical to profile a large application using instrumentation.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The principles described herein are related to a computer system configured to profile a program during an execution of the program. Profiling the program includes obtaining, by a first profiler, a first set of information associated with the execution of the program. In some embodiments, the first profiler is based on sampling. In some embodiments, the first profiler is based on instrumentation. In some embodiments, the first profiler is configured to obtain memory allocation of the program during its execution.

Profiling the program further includes obtaining, by a second profiler, a second set of information associated with one or more executions of a function in the program, wherein the second profiler is configured to dynamically instrument the function in the program. The second set of information includes at least a call count or an execution time of each of the one or more executions of the function. The computer system is further configured to identify a subset of the first set of information that is associated with the execution(s) of the function, and create aggregate information based on (1) the subset of the first set of information, and (2) the second set of information associated with the one or more executions of the function. The aggregate information is then reported.

In some embodiments, dynamically instrumenting the function includes inserting code instructions into the program during runtime. The inserted code instructions are configured to initialize a counter for the function. Each time the function is called, the counter is incremented by one. In response to completion of the execution of the program, a number counted by the counter is recorded as the call count of the function. In some embodiments, the inserted code instructions are further configured to initialize a timer, each time the function is called. In response to completion of an execution of the function, the timer records an execution time of the function. In some embodiments, creating aggregate information further includes computing an average execution time of the function based on each execution time of the function.

In some embodiments, creating aggregate information further includes correlating the subset of the first set of information and the second set of information associated with the execution of the function to detect anomalies.

The principles described herein are also related to a method for profiling a program based on a combination of dynamic instrumentation and sampling and/or another profiler. The method includes profiling the program during an execution of a program. Profiling the program includes obtaining, by a first profiler, a first set of information associated with the execution of the program. In some embodiments, the first profiler is based on sampling. In some embodiments, the first profiler is based on instrumentation. In some embodiments, the first profiler is configured to obtain memory allocation of the program during its execution.

The method further includes dynamically instrumenting a function in the program to gather a second set of information associated with one or more executions of the function. The second set of information includes at least a call count or an execution time of each execution of the function. The method further includes identifying a subset of the first set of information that is associated with the one or more executions of the function, and creating aggregate information based on (1) the subset of the first set of information, and (2) the second set of information associated with the one or more executions of the function. The aggregate information is then reported.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 3 illustrates an example process of executing an example program;

DETAILED DESCRIPTION

Figure 1:
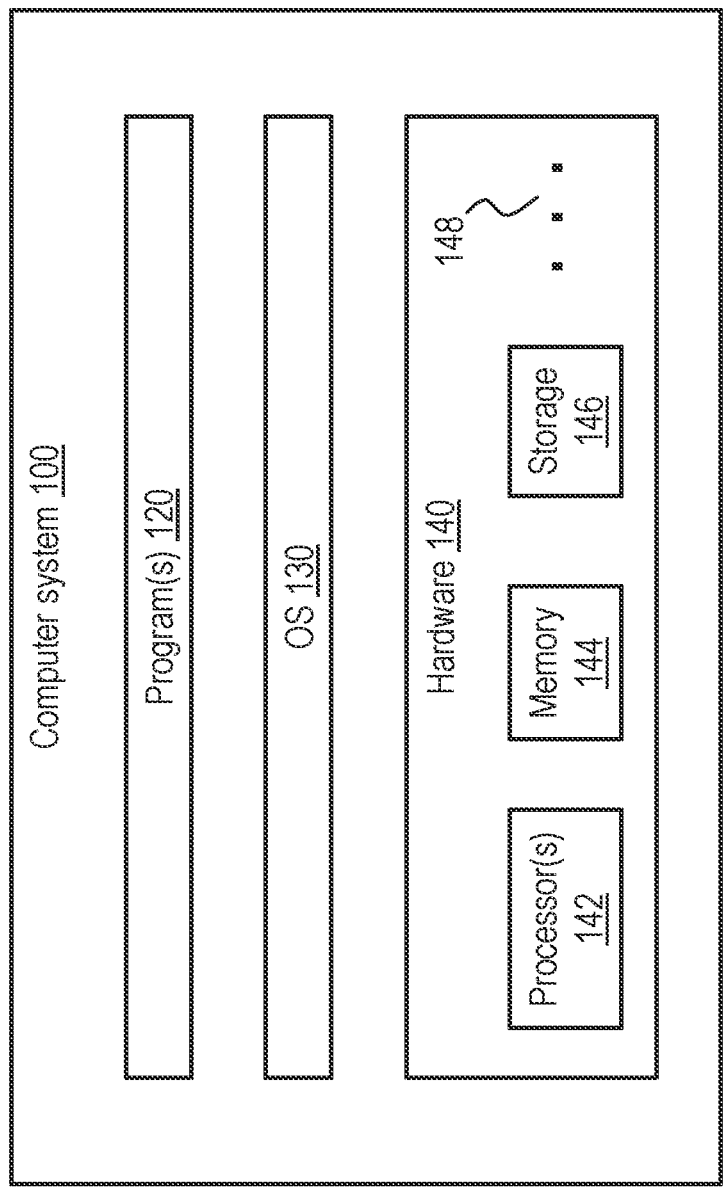
FIG. 1 illustrates an example architecture of a computer system in which the principles described herein may be implemented.

Traditionally, there are generally two methods for finding performance issues of a program using a profiler. One is sampling, and the other is instrumentation. Sampling generally includes periodically asking the program to provide information associated with the execution thereof. Instrumentation generally requires modifying the program, causing the modified program to record the steps during its execution.

The sampling and instrumentation methods each have their own pros and cons. A sampling profiler has the benefit of lower overhead and less disruption, but the information is less accurate, because only limited data is collected. The less data collected, the less statistically significant the results are. This may lead to incorrect conclusions. For example, a sampling profiler may indicate that there is a performance problem when there isn't such a problem, and/or vice versa.

An instrumentation profiler can provide more accurate information, but has the drawback of high overhead and is more disruptive. The instrumentation profiler requires modification of the program to cause the modified program to record the steps during its execution. As such, the instrumentation profiler can record all the events of interest. Although the instrumentation profile can collect more accurate data, it is often not practical to profile a large application using instrumentation.

The principles described herein solve the above-described problem by combining dynamic, lightweight instrumentation with another profiler. The principles described herein are related to a computer system configured to profile a program during an execution of the program. Profiling the program includes obtaining, by a first profiler, a first set of information associated with the execution of the program. In some embodiments, the first profiler is based on sampling. In some embodiments, the first profiler is based on instrumentation. In some embodiments, the first profiler is configured to obtain memory allocation of the program during its execution. Profiling the program further includes dynamically instrumenting a function in the program to gather a second set of information associated with one or more executions of the function. The second set of information includes at least a call count or an execution time of each execution of the function. In some embodiments, the lightweight dynamic instrumentation only gathers a call count and/or an execution time of each execution of the function.

The computer system is further configured to identify a subset of the first set of information that is associated with the execution(s) of the function, and create aggregate information based on (1) the subset of the first set of information and (2) the second set of information associated with the one or more executions of the function.

In some embodiments, the computer system is configured to combine the dynamic, lightweight instrumentation with a memory allocation profiler. The memory allocation profiler may be based on sampling, instrumentation, some other mechanisms, and/or a combination thereof. For example, when the memory allocation profiler is based on sampling, the profiler can use memory allocation events as an interval, and track memory allocations and objects that are generated by a process that was started or attached to. When the memory allocation profiler is based on instrumentation, the profiler can track only those memory allocations and objects that are generated by the instrumented modules. In some embodiments, call counts or execution times of calls are combined and/or correlated with memory allocations collected by the memory allocation profiler.

In some embodiments, dynamically instrumenting the function includes inserting code instructions into the program during runtime. The inserted code instructions are configured to initialize a counter for the function in response to a first time calling the function. Each time the function is called, the counter is incremented by one. In response to the completion of the execution of the program, a number counted by the counter is recorded as the call count of the function. In some embodiments, the inserted code instructions are further configured to initialize a timer, each time the function is called. In response to completion of an execution of the function, the timer records an execution time of the function. In some embodiments, creating aggregate information further includes computing an average execution time of the function based on each execution time of the function.

In some embodiments, creating aggregate information further includes correlating the subset of the first set of information and the second set of information associated with the execution of the function to detect anomalies. The aggregate information is then reported.

FIG. 1 illustrates an example computer system 100 in which the principles described herein may be implemented. The computer system 100 includes hardware 140 and an operating system 130 that together make the computer system usable by users and programs 120. The operating system 130 is often the core software running on the computer system, although there may be additional software layers on top of an operating system that provides other interfaces to users or programs of the system. The hardware 140 of the computer system 100 includes one or more processor(s) 142 (e.g., a central processing unit (CPU)), memory 144 (e.g., random access memory (RAM)), and storage 146 (e.g., hard disks). The ellipsis 148 represents that there may be additional hardware components that are part of the computer system 100, such as (but not limited to)

input/output devices (e.g., keyboard, display, touch screen, etc.). The processor(s) 142 are configured to run instructions and compute data and memory addresses. The memory 144 stores data and instructions of running programs.

Some source code is written in a compiled language (e.g., but not limited to, C++). Such source code is first transformed into machine code (e.g., binary code). This transformation is performed by a program called a compiler. The compiled machine code can then be loaded into the memory 144 and executed by the processor(s) 142. Such machine code that the operating system can load into memory and start is also referred to as "native code."

Some source code is written in a higher-level language and compiled into bytecode. The bytecode can then be run on top of a runtime, such as .NET. Such bytecode is also called "managed code." The runtime is in charge of taking the managed code, compiling it into machine code, and then executing it. On top of that, the runtime generally provides several additional services, such as automatic memory management, security boundaries, type safety, etc.

As briefly discussed above, instrumentation of code includes inserting code instructions into a program to cause information associated with the program to be recorded. In some embodiments, the instrumentation of code includes instrumenting managed code or bytecode. In some embodiments, the instrumentation of code includes instrumenting native code or machine code.

Figure 2A:
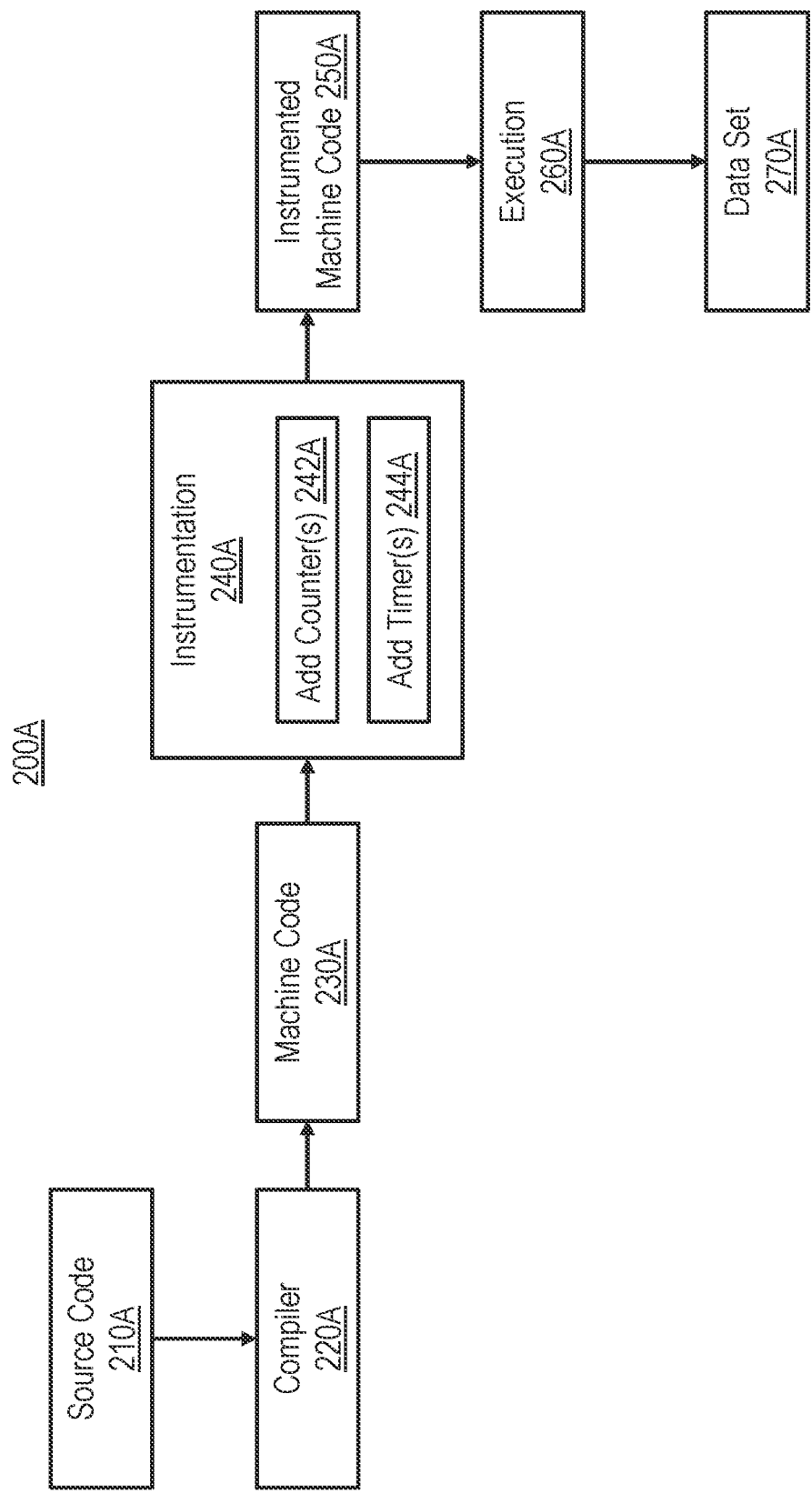
FIG. 2A illustrates an example process of instrumenting machine code or native code.

FIG. 2A illustrates an example process 200A of instrumenting machine code or native code. As illustrated in FIG. 2A, source code 210A of a program is first compiled by a compiler 220A into machine code 230A. The machine code 230A is then instrumented to generate instrumented machine code 250A. In some embodiments, the instrumentation 240A of the machine code 230A includes inserting machine code instructions of one or more counters 242A and/or one or more timers 244A to the machine code 230A. The counters are configured to collect call counts of executions of functions in the program. The timers are configured to record execution times of the functions. The instrumented machine code 250A is then executed by a computer system. After the execution 260A of the instrumented machine code 250A, a dataset 270A associated with executions of the functions is collected.

Figure 2B:
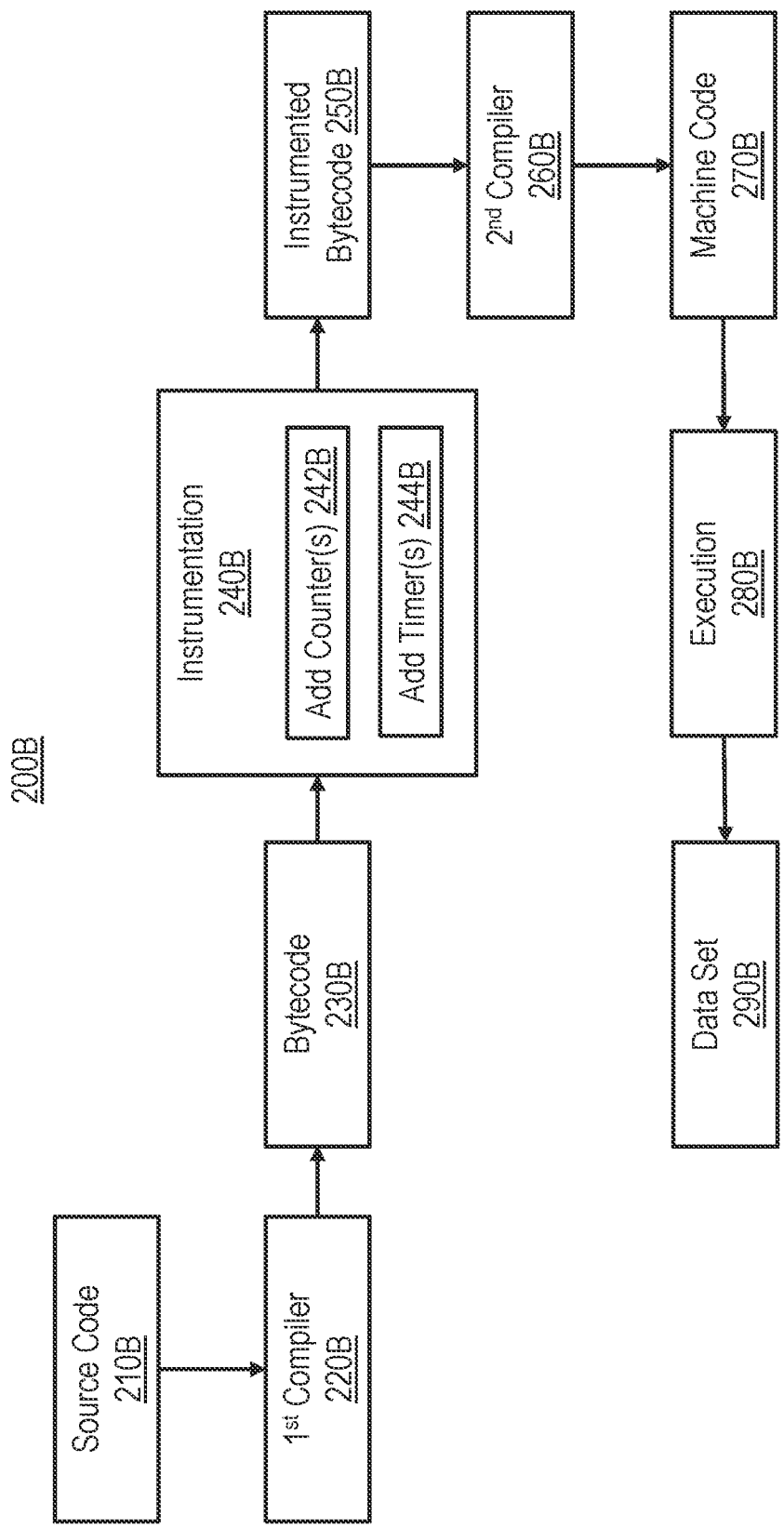
FIG. 2B illustrates an example process of instrumenting bytecode or managed code.

FIG. 2B illustrates an example process 200B of instrumenting managed code or bytecode. As illustrated in FIG. 2B, source code 210B of a program is compiled by a first compiler 220B into bytecode 230B. The bytecode 230B is then instrumented to generate instrumented bytecode 250B. In some embodiments, the instrumentation 240B includes inserting bytecode instructions of one or more counters 242B and/or one or more timers 244B to the bytecode 230B. The counters are configured to collect all counts of executions of functions. The timers are configured to record execution times of the functions. The instrumented bytecode 250B is then compiled by a second compiler 260B to generate machine code 270B. The machine code 270B is then executed by a computer system. After the execution 280B of the machine code 270B, a dataset 290B is collected. Similar to the dataset 270A of FIG. 2A, the dataset 290B includes at least a call count of a function in the program, and/or an execution time of each execution of the function.

In some embodiments, instrumentation 240A or 240B in FIG. 2A or 2B includes dynamically instrumenting a function in response to a first time of calling the function. As such, if the function is not called, the computer system is not burdened with performing additional computations related to instrumentation. In some embodiments, a counter is initialized for a function in response to a first time of calling the function. Each time the function is called, the counter is incremented by one. In response to completion of the execution of the program, a number counted by the counter is recorded as the call count of the function. In some embodiments, a timer is initialized each time the function Is called. In response to the completion of execution of the function, the timer is configured to record an execution time of the function.

In some embodiments, additional information associated with the function can also be dynamically instrumented based on the purpose of the instrumentation. Alternatively, the dynamically instrumenting the function is lightweight, such that only limited information, such as a call count and/or an execution time of each execution of the function, is collected. In some embodiments, all the functions are dynamically instrumented. Alternatively, only a subset of functions, e.g., (but not limited to) a particular type of function, a particular function, a predetermined set of functions, are instrumented based on user selection or based on the purpose of the instrumentation.

Notably, a program normally includes a plurality of functions. These functions may be called one or more times during an execution of the program. In some cases, a function is called by another function. In some cases, a function is called when a particular condition is true or false. In some cases, a function is called in response to a particular event. FIG. 3 illustrates an example execution process 300 of an example program. As illustrated in FIG. 3, once the program starts executing (act 310), function A is first executed (act 320). In response to executing function A, function B and/or function C may then be called and executed (acts 330, 340). In response to executing function B or function C, function A may then be called and executed again. Ellipsis 350 represents that there may be any number of functions in the program that may be executed at any time or under any order for any number of times.

Figure 4A:
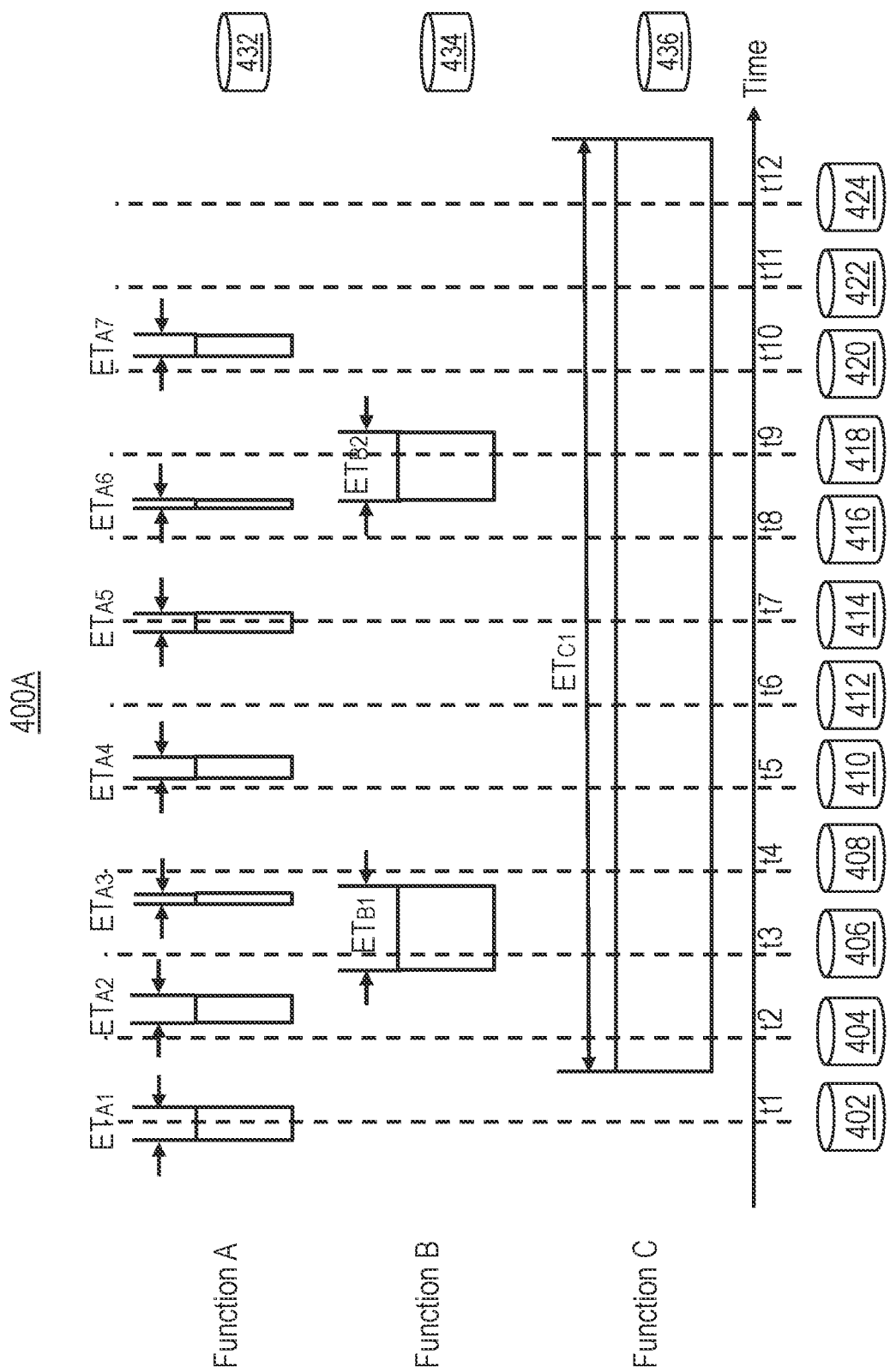
FIG. 4A illustrates an example process of profiling a program based on a combination of dynamic instrumentation and sampling.

During the execution of a program, the program can be profiled based on a combination of sampling and dynamic instrumentation. FIG. 4A illustrates an example process 400A of profiling a program, including function A, function B, and function C. The horizontal axis represents time. Notably, each function may be executed any number of times during the execution of the program, and each execution may take any amount of time. As illustrated in FIG. 4A, function A is executed seven times, each of which corresponds to a respective execution time $ET_{A1}$, $ET_{A2}$, $ET_{A3}$, $ET_{A4}$, $ET_{A5}$, $ET_{A6}$, or $ET_{A7}$; function B is executed twice, each of which corresponds to a respective execution time $ET_{B1}$, or $ET_{B2}$; and function C is executed only once, which corresponds to an execution time $ET_{C1}$. Notably, function A has been executed the most number of times, while each execution of function A takes a fairly short amount of time, $ET_{A1}$, $ET_{A2}$, $ET_{A3}$, $ET_{A4}$, $ET_{A5}$, $ET_{A6}$, or $ET_{A7}$. On the contrary, function C is only executed once, while the execution of function C takes a much longer time, $ET_{C1}$.

As shown in FIG. 4A, during the execution of the program, a first profiler and a second profiler are implemented. The first profiler is based on sampling, and the second profiler is based on instrumentation. The sampling can be performed at a predetermined frequency, at predetermined times, or at random times. As illustrated in FIG. 4A, the sampling is performed at times t1-t12. At each time t1-t12, a first set of information associated with the execution of the program is collected. For example, at time t1, dataset 402 is collected; at time t2, dataset 404 is collected; at time t3, dataset 406 is collected, and so on and so forth. At the same time, instrumentation is performed for each of function A, function B, and function C to collect a second set of information. For example, for function A, dataset 432 is collected; for function B, dataset 434 is collected, and for function C, dataset 436 is collected.

In some embodiments, to reduce the overhead of instrumentation, lightweight instrumentation is performed, during which only limited data, such as a call count and/or an execution time of each execution of the function, is collected. For example, in some embodiments, dataset 432 may include a call count of function A (=7), and/or the execution times $ET_{A1}$, $ET_{A2}$, $ET_{A3}$, $ET_{A4}$, $ET_{A5}$, $ET_{A6}$, or $ET_{A7}$; dataset 434 may include a call count of function B (=2) and/or execution times $ET_{B1}$, or $ET_{B2}$; and dataset 436 may include a call count of function C (=1) and/or an execution time $ET_{C1}$.

In embodiments, the instrumentation described herein includes dynamically instrumenting functions. In some embodiments, dynamically instrumenting a function includes inserting code instructions into the program during its execution, causing the behavior of a function to be recorded only in response to calling the function.

In some embodiments, the code instructions are configured to initialize a counter for the function. Each time the function is called, the counter is incremented by one. In response to the completion of the execution of the program, a number counted by the counter is recorded as the call count of the function.

In some embodiments, the code instructions are configured to initialize a timer each time the function is called. In response to the completion of an execution of the function, the timer is configured to record as an execution time of the function. In some embodiments, each time the function is called, a first time is recorded; when the execution of the function is completed, a second time is recorded. The execution time is computed based on the first time and the second time.

In some embodiments, the code instructions are configured to allocate a portion of memory to record the second set of information associated with the execution of the function. In some embodiments, the code instructions are configured to allocate a portion of memory having a particular address to store an integer value that is initially set as zero. Each time the function is called, the integer value stored at the particular address is incremented by one. In some embodiments, the portion of memory, e.g., an array, is allocated to store a sequence of execution times of the function.

In some embodiments, the computer system is further configured to identify a subset of functions in the program that are each to be dynamically instrumented. As such, only the subset of targeted functions is instrumented, further reducing the overhead of instrumentation.

The first set of information and the second set of information collected based on instrumentation are then aggregated to create aggregate information. In particular, a subset of the first set of information associated with the one or more executions of a function is identified. The subset of the first set of information and the second set of information associated with the one or more executions of the function are then aggregated to create aggregate information.

Figure 4B:
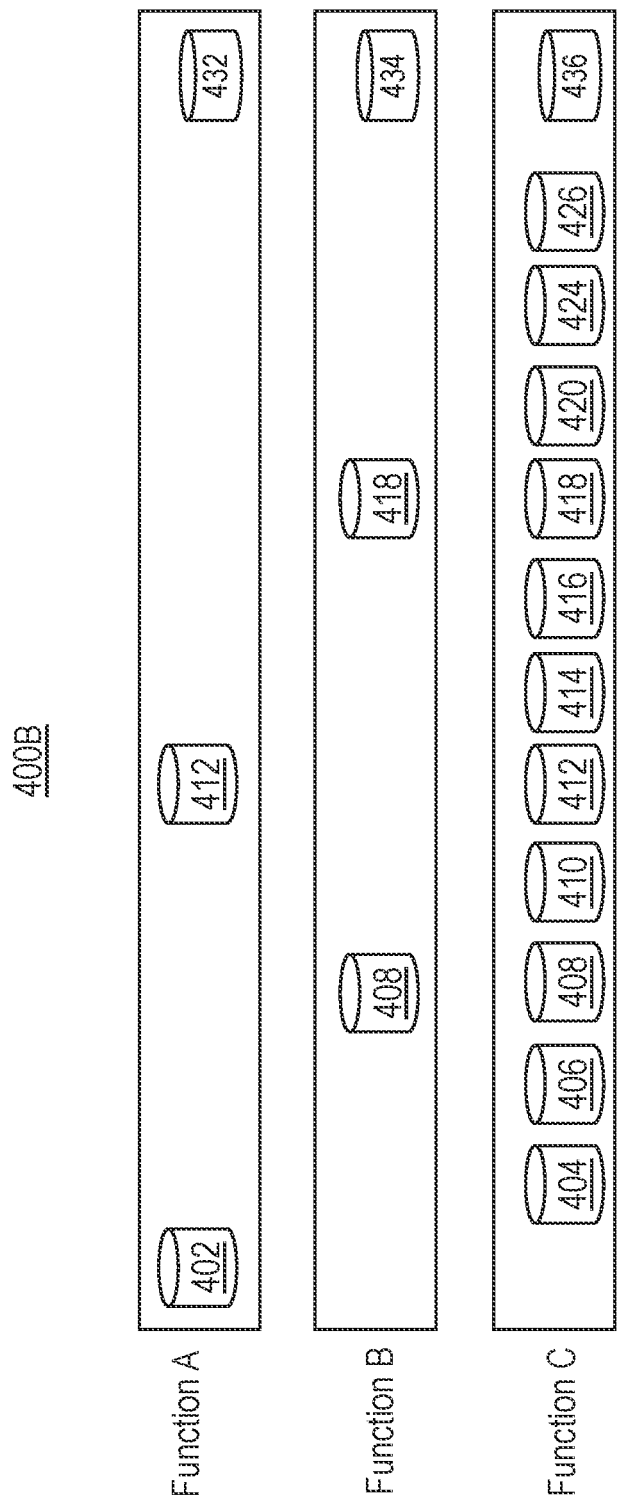
FIG. 4B illustrates an example process of aggregating datasets collected based on dynamic instrumentation and datasets collected based on sampling.

FIG. 4B illustrates an example process 400B of creating aggregate information. As illustrated in FIG. 4B, datasets 402 and 412 based on sampling include information associated with executions of function A. Dataset 432 based on instrumentation also includes information associated with executions of function A. Thus, datasets 402 and 412 are aggregated with dataset 432. Similarly, datasets 408 and 418 based on sampling include information associated with executions of function B. Dataset 434 based on instrumentation also includes information associated with executions of function B. Thus, datasets 408, 418 are aggregated with dataset 434. Again, datasets 404, 406, 408, 410, 412, 414, 416, 418, 420, 422, 424, and 426 based on sampling include information associated with execution of function C. Dataset 436 based on instrumentation also includes information associated with the execution of function C. Thus, datasets 404, 406, 408, 410, 412, 414, 416, 418, 420, 422, 424, and 426 are aggregated with dataset 436.

In some embodiments, the first set of information and the second set of information are correlated to identify anomalies. For example, as illustrated in FIGS. 4A and 4B, the call count of function A is 7 (which is the highest among functions A, B, and C), while there are only two sets of sampling data collected, indicating a likelihood of anomaly. On the contrary, the call count of function C is 1 (which is the lowest among functions A, B, and C), while there are 11 sets of sampling data collected, also indicating a likelihood of anomaly.

In some embodiments, creating aggregate information includes computing an average execution time of the function based on the sequence of execution times recorded. In some embodiments, creating aggregate information includes identifying a relationship between a number of samplings collected associated with a function, a total call count of the function, and/or an average execution time of the function.

In some embodiments, creating aggregate information includes computing a ratio between a number of samplings collected during executions of a function and a total call count of the function. When the ratio is greater than a threshold, it is determined that an anomaly exists. In some embodiments, when a number of sampling collected during the executions of the function is greater than a first threshold, and/or a total call count of the function is lower than a second threshold, it is determined that an anomaly exists.

In some embodiments, the computer system is configured to combine the dynamic, lightweight instrumentation with a memory allocation profiler. The memory allocation profiler may be based on sampling, instrumentation, some other mechanisms, and/or a combination thereof. For example, when the memory allocation profiler is based on sampling, the profiler can use memory allocation events as an interval, and track memory allocations and objects that are generated by a process that was started or attached to. When the memory allocation profiler is based on instrumentation, the profiler generally track only those memory allocations and objects that are generated by the instrumented modules. In some embodiments, creating aggregate information includes aggregating call counts or execution times of calls with memory allocations collected by the memory allocation profiler.

Figure 5:
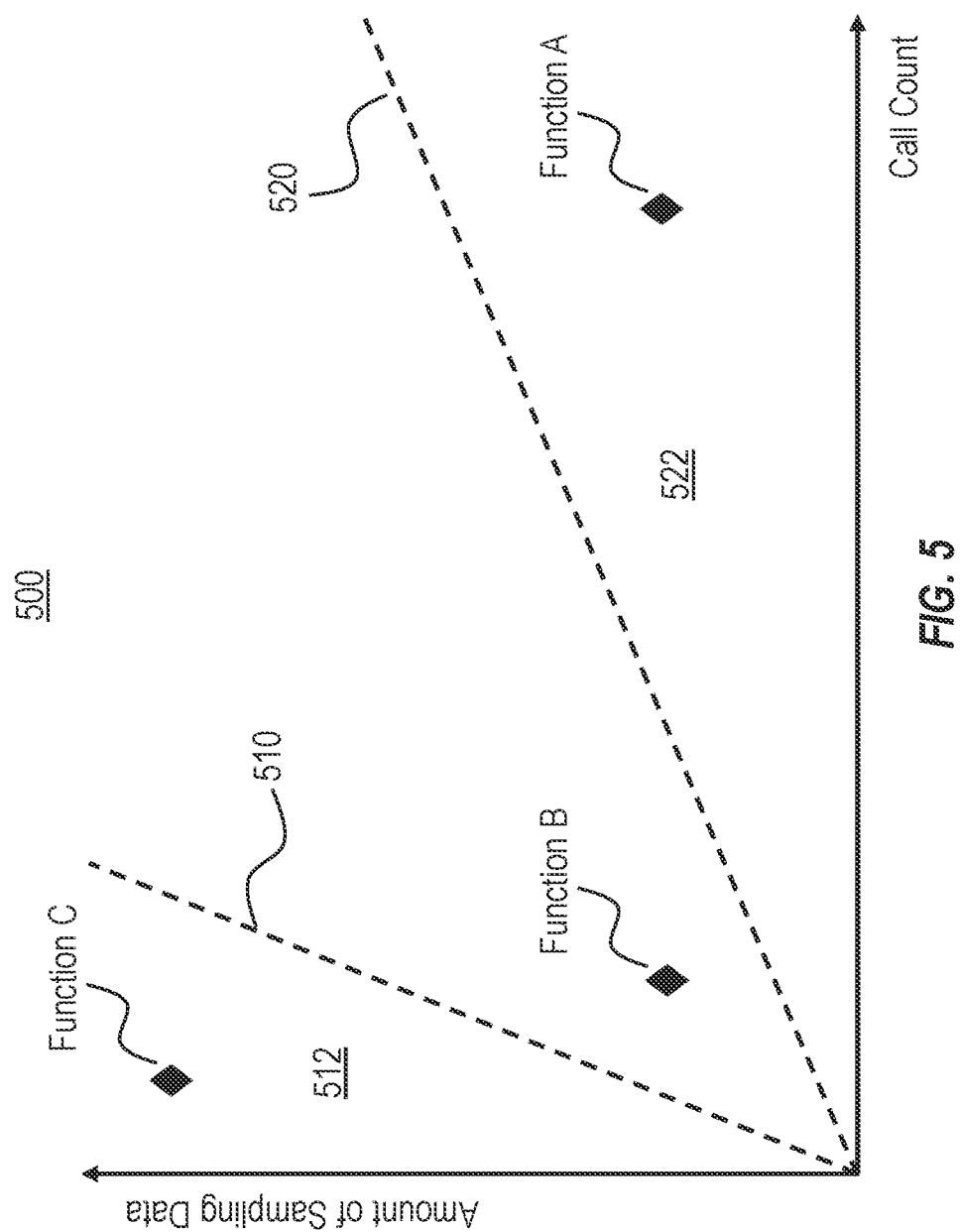
FIG. 5 illustrates a relationship between call counts and amounts of sampling data corresponding to a plurality of functions.

FIG. 5 illustrates a relationship 500 between a call count and an amount of sampling data collected for functions A, B, and C. The horizontal axis represents call counts, and the vertical axis represents amounts of sampling data collected. As illustrated in FIG. 5, function A corresponds to a high call count, but a small amount of sampling data; and function B corresponds to a low call count, but a high amount of sampling data. A first area 512 between the vertical axis and dotted line 510 represents a first anomalous area, and a second area 522 between the horizontal axis and dotted line 520 represents a second anomalous area. Any data points (corresponding to functions) that fall in the first area 512 or second area 522 may be deemed anomalous.

After the aggregate information is created, the aggregate information can then be reported. In some embodiments, in response to detecting an anomaly, an alert is generated and sent to a user.

Figure 6:
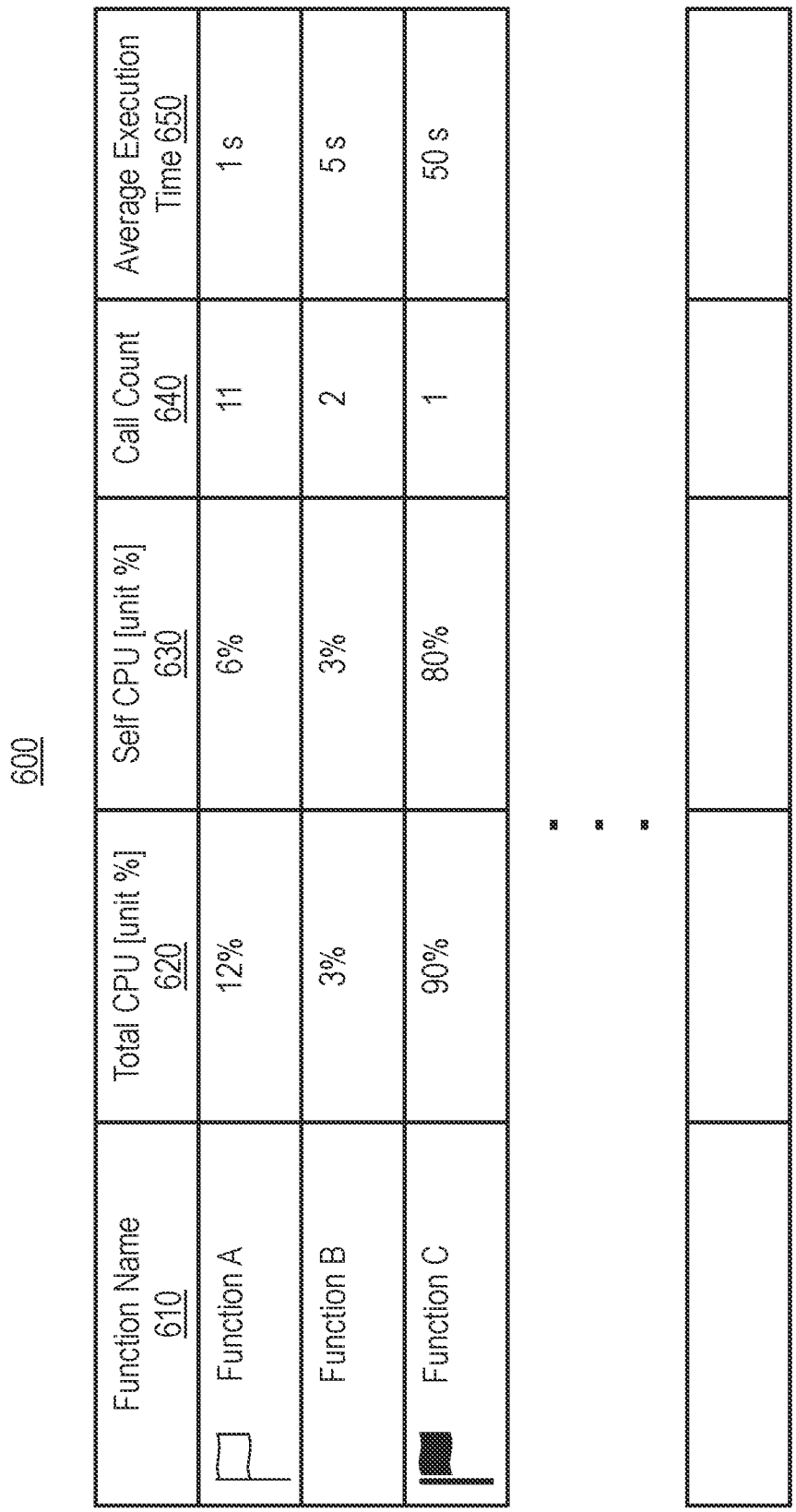
FIG. 6 illustrates an example user interface that reports aggregate information generated based on datasets collected from dynamic instrumentation and datasets collected from sampling.

FIG. 6 illustrates an example user interface 600 configured to report aggregate information. The user interface 600 includes a table having a plurality of columns, including (but not limited to) function name 610, total CPU 620, self CPU 630, call count 640, and/or average execution time 650. The data associated with total CPU 620 and self CPU 630 are collected based on sampling. The data associated with call count 640 and average execution time 650 are collected based on instrumentation. In some embodiments, in response to detecting an anomalous function, the function is flagged to generate an alert. As illustrated in FIG. 6, functions A and C are flagged as anomalous.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
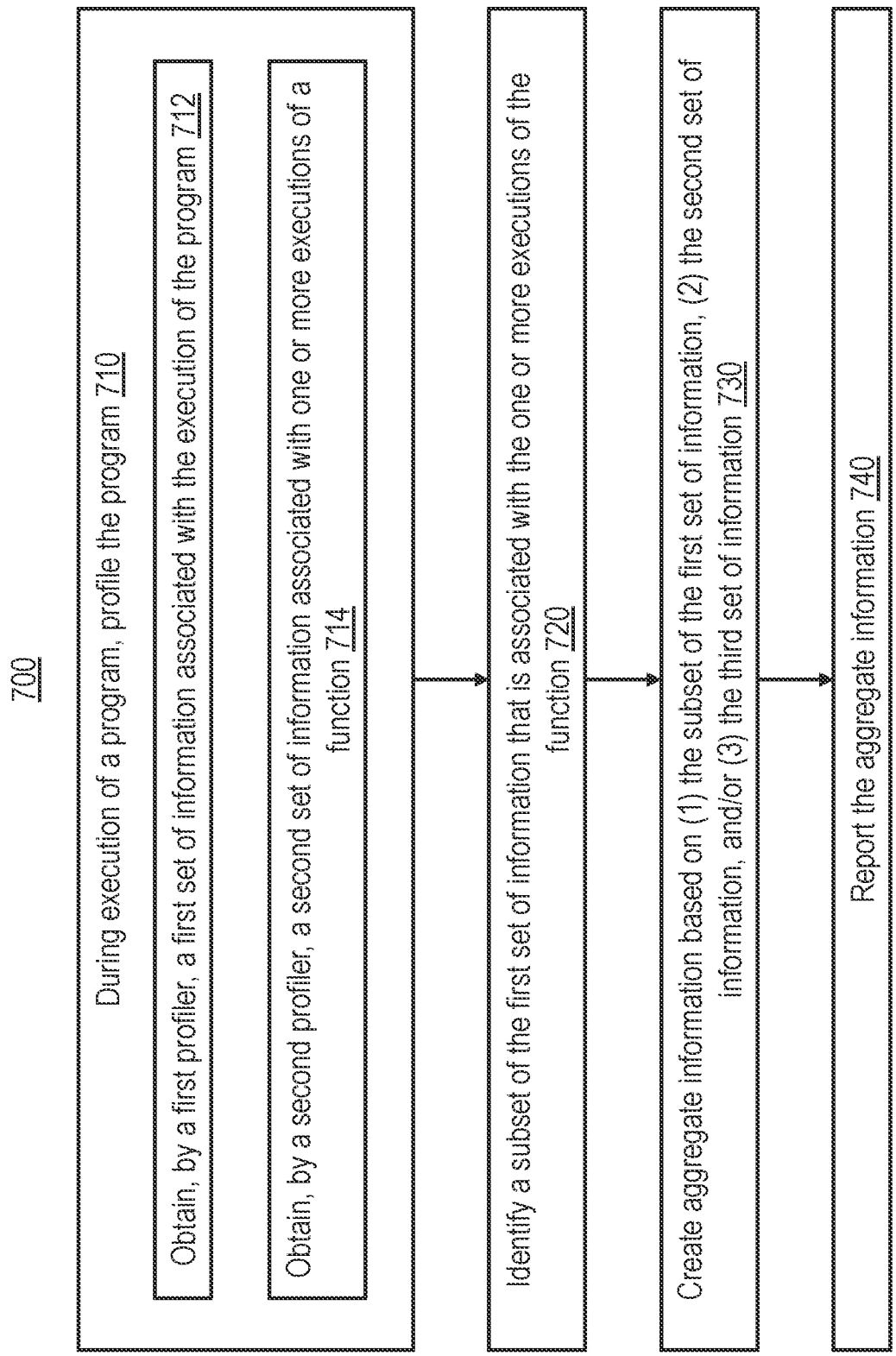
FIG. 7 illustrates a flowchart of an example method for profiling a program based on a combination of dynamic instrumentation and sampling.

FIG. 7 illustrates a flowchart of a method 700 for profiling a program based on a combination of dynamic instrumentation and sampling. The method 700 includes profiling the program during an execution of the program (act 710). Profiling the program (act 710) includes obtaining, by a first profiler, a first set of information associated with the execution of the program (act 712), and obtaining, by a second profiler, a second set of information associated with one or more executions of a function (act 714).

In some embodiments, the first profiler is based on sampling. In some embodiments, the first profiler is based on instrumentation. In some embodiments, the first profiler is configured to obtain memory allocation of the program during its execution. In some embodiments, the second profiler is configured to dynamically instrument the function in the program during runtime. In some embodiments, dynamically instrumenting the function in the program includes inserting code instructions into bytecode of the program prior to compiling the bytecode to native code. In some embodiments, dynamically instrumenting the function in the program includes inserting code instructions into native code of the program.

The second set of information includes at least a call count or an execution time of each execution of the function. In some embodiments, dynamically instrumenting the function includes inserting code instructions into the program during runtime. The code instructions are configured to initialize a counter for the function during runtime. Each time the function is called, the counter is incremented by one. In response to completion of the execution of the program, a number counted by the counter is recorded as the call count of the function.

In some embodiments, the code instructions are further configured to initialize a timer each time the function Is called. In response to the completion of an execution of the function, the timer is configured to record execution time of the function. In some embodiments, when the function is called, a first time is recorded; and when the execution of the function is completed, a second time is recorded. The execution time of the function is computed based on the first time and the second time.

The method 700 further includes identifying a subset of the first set of information that is associated with the one or more executions of the function (act 720), and creating aggregate information based on (1) the subset of the first set of information, and (2) the second set of information associated with the one or more executions of the function (act 730). In some embodiments, creating aggregate information further includes computing an average execution time of the function based on each execution time of the function. In some embodiments, creating aggregate information further includes correlating the subset of the first set of information with the second set of information to identify anomalies. In some embodiments, creating aggregate information further includes computing a ratio between a number of samplings collected during the one or more executions of the function and a total call count of the function. When the ratio is greater than a threshold, it is determined that an anomaly exists. In some embodiments, when a number of sampling collected during the one or more executions of the function is greater than a first threshold, and/or a total call count of the function is lower than a second threshold, it is determined that an anomaly exists.

The method 700 further includes reporting the aggregate information (act 740). In some embodiments, reporting the aggregate information includes flagging the function or generating an alert in response to detecting anomalies.

Figure 8:
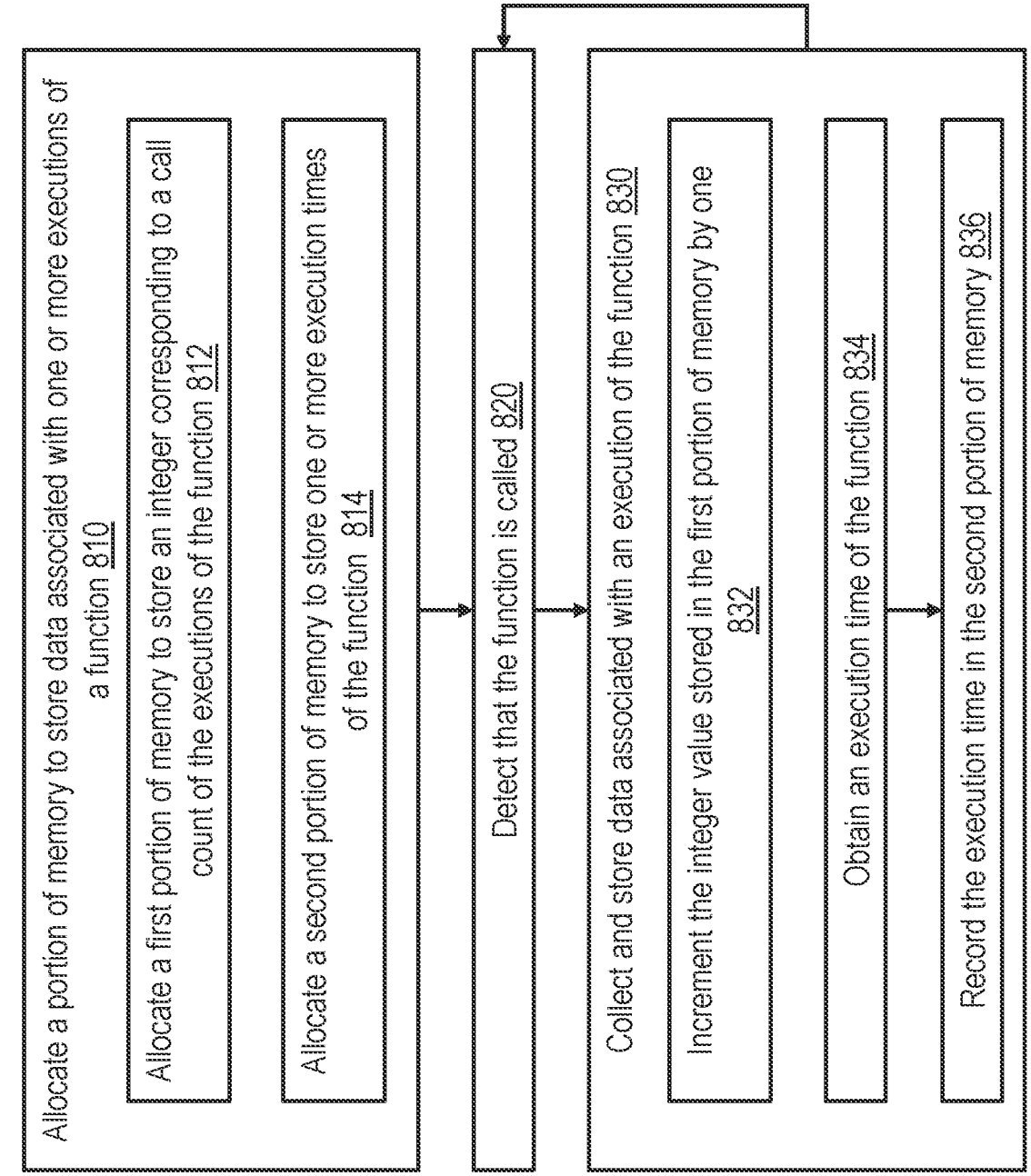
FIG. 8 illustrates a flowchart of an example method for lightweight instrumenting a function of a program.

FIG. 8 illustrates a flowchart of an example method 800 for dynamically instrumenting a function, which corresponds to act 714 of FIG. 7. The method 800 includes allocating a portion of memory to store data associated with one or more executions of a function (act 810). In some embodiments, the allocation of memory (act 810) is performed dynamically only during runtime. In some embodiments, the allocation of memory (act 810) includes allocating a first portion of memory to store an integer corresponding to a call count (act 812). In some embodiments, the allocation of memory (act 810) includes allocating a second portion of memory to store one or more executions times of the function (act 814). In some embodiments, the second portion of memory is an array configured to store a sequence of execution times of the function.

The method 800 also includes detecting that the function is called (act 820). In response to detecting that the function is called (act 820), data associated with an execution of the function is collected and stored in the allocated portion of memory (act 830). In some embodiments, the storage of data (act 830) includes incrementing the integer value (corresponding to the call count) stored in the first portion of memory by one (act 832). In some embodiments, the storage of data (act 830) further includes obtaining an execution time of the function (act 834) and recording an execution time in the second portion of memory (act 836).

In some embodiments, additional data associated with the function is also instrumented. In some embodiments, the dynamic instrumentation is lightweight instrumentation, during which only limited data is collected. In some embodiments, only a call count is recorded and/or only execution times are recorded, such that the overhead of instrumentation is reduced.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 100) that includes hardware 140, such as, for example, one or more processors (e.g., processor(s) 142) and system memory (e.g., memory 144). Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., memory 144, storage 146). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including,"

and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed is:

1. A computer system comprising:
   one or more processors; and
   one or more computer-readable hardware storage devices having stored thereon computer-executable instructions that are structured such that, when the computer-executable instructions are executed by the one or more processors, the computer system is configured to:
      during an execution of a program, profile the program by at least:
         obtaining, by a first profiler, a first set of information associated with the execution of the program; and
         obtaining, by a second profiler, a second set of information associated with one or more executions of a function in the program, the second set of information comprising at least a call count or an execution time of each of the one or more executions of the function;
      identify a subset of the first set of information that is associated with the one or more executions of the function;
      create aggregate information based on (1) the subset of the first set of information, and (2) the second set of information associated with the one or more executions of the function, including detecting an anomaly based on correlating the first set of information and the second set of information associated with the execution of the function, the anomaly being detected when a number of samples collected during the one or more executions of the function are greater than a first threshold, and a total call count of the function is lower than a second threshold; and
      report the aggregate information.

2. The computer system of claim 1, wherein the second profiler is configured to dynamically instrument the function, dynamically instrumenting the function including inserting code instructions into the program which:
   during runtime of the program, initialize a counter for the function;
   each time the function is called, increment the counter by one; and
   in response to completion of the execution of the program, record a number counted by the counter as the call count of the function.

3. The computer system of claim 2, wherein dynamically instrumenting the function further includes inserting code instructions into the program which:
   each time the function is called, initialize a timer; and
   in response to completion of an execution of the function, record an execution time of the function.

4. The computer system of claim 3, wherein creating aggregate information further includes computing an average execution time of the function based on each execution time of the function.

5. The computer system of claim 2, wherein dynamically instrumenting the function includes inserting code instructions into the program which:
   allocate a portion of memory to record the second set of information associated with execution of the function.

6. The computer system of claim 2, wherein dynamically instrumenting the function includes inserting code instructions into the program which:
   allocate a portion of memory having a particular address to store an integer value that is initially set as zero; and
   each time the function is called, increment the integer value stored at the particular address by one.

7. The computer system of claim 1, wherein the computer system is further configured to identify a subset of functions in the program that are each to be dynamically instrumented.

8. The computer system of claim 1, wherein the computer system is further configured to flag the function or generate an alert in response to detecting the anomaly.

9. The computer system of claim 1, wherein dynamically instrumenting a function in the program comprises (1) inserting code instructions into bytecode of the program prior to compiling the bytecode to native code, or (2) inserting code instructions into native code of the program.

10. The computer system of claim 1, wherein the first profiler is a memory allocation profiler, and the first set of information is an associated memory allocation of the program or the function.

11. A method implemented at a computer system for profiling a program based on a combination of multiple profilers, the method comprising:
    during an execution of a program,
       obtaining, by a first profiler, a first set of information associated with the execution of the program; and
       obtaining, by a second profiler, a second set of information associated with one or more executions of a function in the program, the second set of information comprising at least a call count or an execution time of each of the one or more executions of the function;
    identify a subset of the first set of information that is associated with the one or more executions of the function;
    create aggregate information based on (1) the subset of the first set of information, and (2) the second set of information associated with the one or more executions of the function, including detecting an anomaly based on correlating the first set of information and the second set of information associated with the execution of the function, the anomaly being detected when a number of samples collected during the one or more executions of the function are greater than a first threshold, and a total call count of the function is lower than a second threshold; and
    report the aggregate information.

12. The method of claim 11, wherein dynamically instrumenting the function includes inserting code instructions into the program which:
    during runtime of the program, initialize a counter for the function;
    each time the function is called, increment the counter by one; and
    in response to completion of the execution of the program, record a number counted by the counter as the call count of the function.

13. The method of claim 11, wherein dynamically instrumenting the function further includes inserting code instructions into the program which:

each time the function is called, initialize a timer; and in response to completion of an execution of the function, record an execution time of the function.

14. The method of claim 13, wherein creating aggregate information further includes computing an average execution time of the function based on each execution time of the function.

15. The method of claim 11, wherein dynamically instrumenting the function includes inserting code instructions into the program which:

allocate a portion of memory to record the second set of information associated with execution of the function.

16. The method of claim 11, wherein dynamically instrumenting the function includes inserting code instructions into the program which:

allocate a portion of memory having a particular address to store an integer value that is initially set as zero; and each time the function is called, increment the integer value stored at the particular address by one.

17. A computer program product comprising one or more hardware storage devices having stored thereon computer-executable instructions that are structured such that, when the computer-executable instructions are executed by one or more processors of a computer system, the computer system is configured to:

during an execution of a program, profile the program by at least:

obtaining, by a first profiler, a first set of information associated with the execution of the program; and obtaining, by a second profiler, a second set of information associated with one or more executions of a function in the program, the second set of information comprising at least a call count or an execution time of each of the one or more executions of the function;

identify a subset of the first set of information that is associated with the one or more executions of the function;

create aggregate information based on (1) the subset of the first set of information, and (2) the second set of information associated with the one or more executions of the function, including detecting an anomaly based on correlating the first set of information and the second set of information associated with the execution of the function, the anomaly being detected when a number of samples collected during the one or more executions of the function are greater than a first threshold, and a total call count of the function is lower than a second threshold; and report the aggregate information.

* * * * *